United States Patent
Brazier

[19]

[11] 3,718,844
[45] Feb. 27, 1973

[54] CAPACITOR WITH TERMINAL CLIPS

[75] Inventor: Robert Leo Brazier, Pickens, S.C.

[73] Assignee: Sangamo Electric Company, Springfield, Ill.

[22] Filed: Jan. 22, 1971

[21] Appl. No.: 108,908

[52] U.S. Cl. ................317/258, 29/25.42, 317/261
[51] Int. Cl. .............................................H01g 1/14
[58] Field of Search ..........317/258, 261; 275/157.5; 29/25.42; 336/192

[56] References Cited

UNITED STATES PATENTS

| 648,446 | 5/1900 | Varley | 336/192 |
| 1,699,665 | 1/1929 | Junker | 75/157.5 |
| 2,195,434 | 4/1940 | Silliman | 75/157.5 |
| 3,150,300 | 9/1964 | Schils | 317/261 X |
| 3,458,783 | 7/1969 | Rosenberg | 317/261 X |
| 3,522,493 | 8/1970 | O'Mara | 317/261 X |

FOREIGN PATENTS OR APPLICATIONS

| 351,809 | 8/1937 | Italy | 317/261 |

Primary Examiner—E. A. Goldberg
Attorney—Johnson, Dienner, Emrich, Verbeck & Wagner

[57] ABSTRACT

A capacitor having superimposed silvered mica sheets secured by end clips to which conductor lead wires are connected with their axes coinciding with the center axis of the assembled sheets, the sheets and lead wires being encased centrally within a cylindrical insulating casing with the lead wires extending axially outwardly of the casing.

9 Claims, 3 Drawing Figures

PATENTED FEB 27 1973
3,718,844
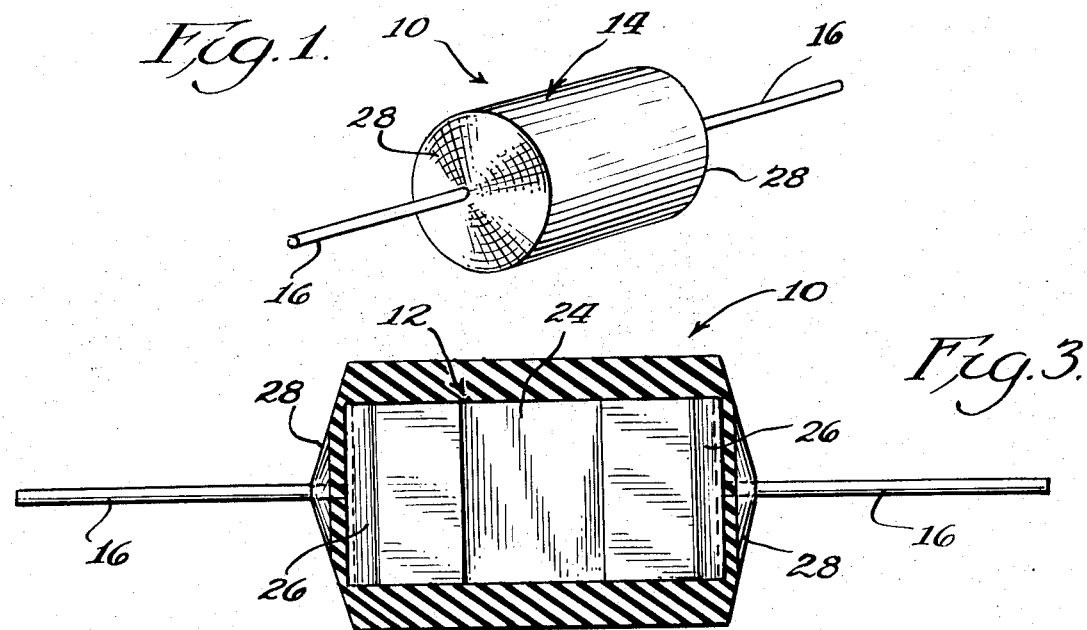
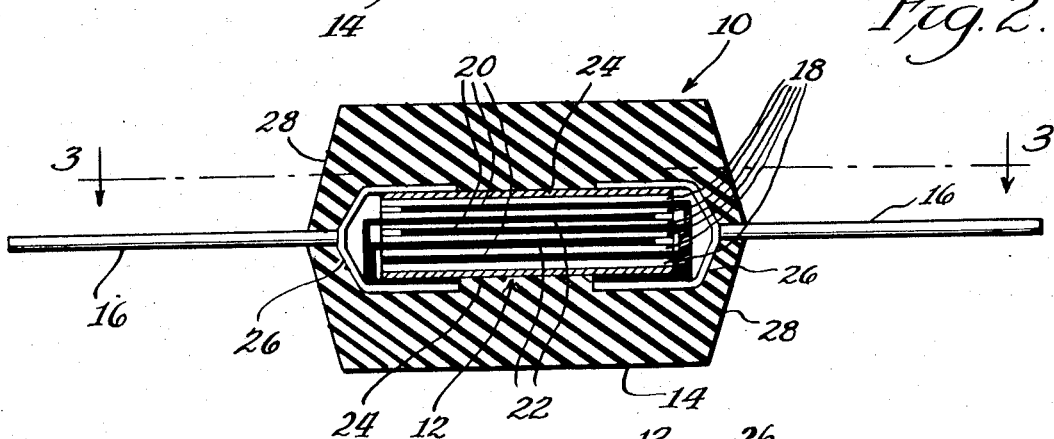
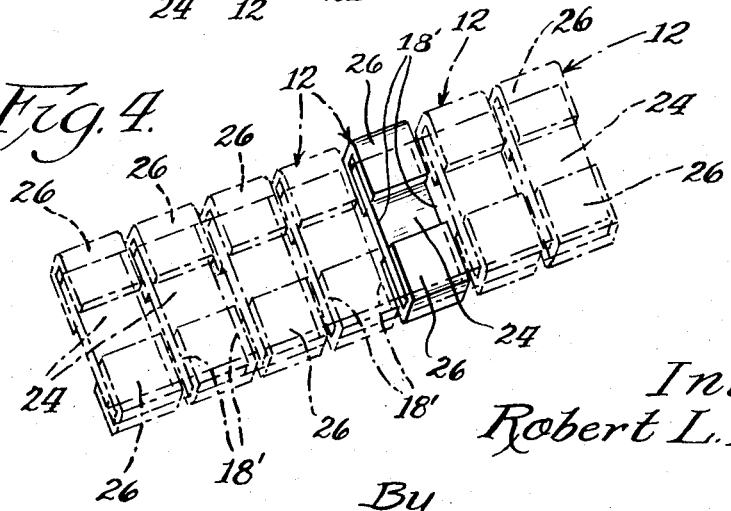
Inventor
Robert L. Brazier
By Johnson, Dienner, Emrich, Verbeck & Wagner
Attys.

CAPACITOR WITH TERMINAL CLIPS

BACKGROUND OF THE INVENTION

The present invention relates generally to capacitors, and more particularly to a capacitor particularly adapted for use with automatic insertion equipment.

It is known to make mica capacitor sections comprising superimposed silvered mica sheets having foil electrodes interposed between the silvered sheets to connect alternate sheets in parallel. The known mica capacitors generally have annular bands or straps crimped peripherally around the superimposed silvered mica sheets to clamp them in superimposed relation, the annular bands being adjacent opposite ends of the sheets and encompassing the corresponding foil electrodes. Terminal lead wires are thereafter connected to the annular bands or straps such that the lead wires are longitudinally aligned and extend outwardly from the ends of the capacitor parallel to the longitudinal axis of the superimposed sheets. The assembled sheets, bands and lead wires are generally coated or encapsulated with an insulating material such as resin along the length of the capacitor section with the terminal lead wires extending axially outwardly of the encapsulating material.

In the known encapsulated capacitor sections, the associated lead wires extend axially outwardly of the casing but are non-axially aligned with the longitudinal axis of the silvered dielectric sheets. The encapsulating material is therefore not of uniform thickness about the peripheral surface of the capacitor section. As a result, the longitudinal axis of the capacitor section does not coincide with the longitudinal axis of the casing and a greater thickness of casing material is provided on one side of the capacitor than on the other. See for example U.S. Pat. No. 3,522,493 to W. H. O'Mara et al. Such non-uniformity in casing thickness substantially limits the capacitance of the encapsulated capacitor for a given case size and thus severely limits the uses for which the capacitor may be employed. There is a particular need in the field for capacitors having increased capacitance yet which are usable with automatic insertion equipment. The known prior art has specifically failed to provide mica capacitors which have a 100 volt working voltage and up to 700 pF capacitance in a case having a diameter of 0.2 inch and a length of 0.35 inch, which size and rating have particular use with automatic insertion equipment.

In attempting to provide a capacitor of increased pF per case size ratio for use in automatic insertion equipment, the apparent answer would be to increase the diameter of the casing to obtain sufficient wall thickness about the capacitor section and thereby achieve the desired capacitance rating. Such increased diameter casings, however, substantially reduce the adaptability of the capacitors for use with automatic insertion machines as employed in the manufacture of printed circuit boards and the like. Accordingly, there exists a need for a capacitor having a relatively high capacitance to case size ratio which is readily used with automatic insertion equipment and the present invention is directed to such arrangement.

SUMMARY OF THE INVENTION

The present invention provides a capacitor having a plurality of silvered mica dielectric sheets secured by end clips in superimposed relation with outer mica insulating sheets. Two sets of conductive foil electrodes are provided with the electrodes of each set being interposed between alternate sheets of silvered dielectric and connected in parallel. The sets of foil electrodes extend outwardly of opposite ends of the dielectric sheets with the end clips being secured over the opposite ends of the superimposed sheets in conductive contact with the corresponding set of foil electrodes. A conductor lead wire is secured to each of the end clips such that the lead wires are longitudinally aligned and have their axes coinciding with the longitudinal axis of the assembled superimposed sheets. The silvered dielectric sheets, foil electrodes, end clips and lead wires are then encapsulated in an insulating casing having a cylindrical outer peripheral surface, with the lead wires extending axially outwardly of the casing. The end clips are made of a selected copper zinc alloy compatible for welding with tin-lead coated copper lead wires.

BRIEF DESCRIPTION OF THE DRAWINGS

FIG. 1 is a perspective view of a mica capacitor in accordance with the present invention;

FIG. 2 is an enlarged longitudinal sectional view of the capacitor of FIG. 1;

FIG. 3 is a sectional view taken generally along line 3—3 of FIG. 2 looking in the direction of the arrows; and FIG. 4 is a perspective view of the superimposed dielectric plates and insulating sheets secured together by end clips prior to or after being cut into shorter width segments during manufacturing of the capacitor sections.

DESCRIPTION OF A PREFERRED EMBODIMENT

Referring now to the drawings, a mica capacitor in accordance with the present invention is indicated generally at 10. The mica capacitor 10 includes a capacitor section assembly, indicated generally at 12 in FIG. 2, which is encapsulated in a cylindrical molded casing, indicated generally at 14, to seal the capacitor section assembly except for the outer end portions of conductor lead wires 16. The mica capacitor 10 is particularly characterized by having the conductor lead wires 16 secured to and extending from the ends of the capacitor section assembly 12, with the axes of the lead wires being longitudinally aligned and coinciding with the longitudinal axis of the cylindrical casing 14. In this manner, the capacitor section assembly 12 is centered within the cylindrical casing 14 whereby to maintain the desired capacitance of the capacitor while minimizing the diameter of the cylindrical casing such that the capacitor may be readily employed with automatic insertion machines used to insert small resistors, diodes and other electrical components. The capacitor 10 in accordance with the present invention has a substantially smaller outer diameter than the prior art cylindrical mica capacitors the diameters of which preclude use with conventional automatic insertion machines without changing to larger insertion heads. The mica capacitor 10 of the present invention also provides an increased ratio of picofarad to case size diameter over the prior art cylindrically encased mica capacitors.

Noting FIGS. 2 and 3, the capacitor section assembly 12 includes a plurality of superimposed silvered mica plates or sheets 18 each of which comprises a mica dielectric sheet having a conductive electrode coating such as silver, copper or the like applied to opposite surfaces thereof. The mica dielectric sheets are of known construction and have generally rectangular plane configurations. Two sets of conductive electrodes 20 and 22, made from conductive foil material, are provided with the electrodes being interposed between the superimposed mica sheets 18 such that the foil electrodes of each set of electrodes are connected in parallel as is known. Insulating mica sheets 24 are positioned on opposite outer surfaces of the superimposed mica sheets 18 as shown in FIG. 4, the insulating sheets having planar rectangular configurations identical to the mica sheets. The mica sheets 18, the conductive foil electrodes 20 and 22, and the insulating sheets 24 are assembled and end clips 26 are secured on opposite ends of the assembled dielectric sheets 18 and insulating sheets 24 in conducting contact with the foil electrodes 20 and 22. The clips 26 serve to clamp the capacitor elements in their superimposed positions and are made from 60 percent copper — 40 percent zinc alloy metal having a thickness of approximately 0.01 inch. The clips 26 are assembled to the dielectric plates and insulation sheets by swaging.

A conductive lead wire 16 is suitably secured to the center of each of the end clips 26, as by welding, such that the axes of each pair of lead wires are axially aligned and coincide with the longitudinal axis of the assembled rectangular silvered mica sheets 18 and insulating mica sheets 24. The electrically conductive lead wires 16 are made of copper wire or the like, which in one embodiment had a diameter of 0.025 inch and a protective plating of 60 percent tin 40 percent lead which was in the order of 0.0003 inch in thickness.

In order to obtain reliable welding of the plated copper conductive lead wires 16 to the end clips, the copper zinc clips 26 are maintained between the limits of 60 percent copper, 40 percent zinc to 70 percent copper, 30 percent zinc with no more than 2 percent impurities.

After attaching the lead wires 16 to the end clips 26, the capacitor section assembly 12 is encapsulated in the cylindrical casing 14 which comprises a suitable insulating material such as epoxy or silicone molding materials or other suitable resin compositions.

The cylindrical casing 14 has end surfaces 28 which seal the ends of the capacitor section assembly 12 with the conductive lead wires 16 extending outwardly of the casing 14. The casing 14 is preferably applied by a conventional transfer molding process which establishes an outer cylindrical surface for the casing, the outer diameter of the casing being concentric about the longitudinal axis of the capacitor section assembly 12 such that the lead wires 16 are coaxial with the axis of the casing. In addition other well known methods such as vacuum encapsulation, compression moulding and the like may be used in the provision of casing 14.

FIG. 4 illustrates a step in the manufacture of a plurality of mica capacitors 10 and depicts a plurality of the capacitor section assemblies 12 made from lengths of silvered mica dielectric sheets 18 disposed in superimposed relation, with conductive foil electrodes interposed therebetween and insulating plates 24 positioned on opposite outer surfaces of the superimposed mica sheets 18. The lengths of silvered dielectric sheets and insulating sheets are secured along opposite longitudinal edge portions by clips 26 which are swaged onto the assembled plates and electrodes. In this manner, the assembled silvered dielectric sheets 18, insulating sheets 24, electrodes 18, 20 and end clips 26 may be suitably severed into capacitor sections 12 of smaller width by shearing, sawing or other like methods. The conductive lead wires 16 are attached centrally to the opposed end clips 26 prior to or after severing into shorter width segments. The resulting capacitor assemblies are thereafter encapsulated in an insulating casing 14 as described.

With a mica capacitor construction as described, capacitors have been made having a rating of 100 volts D.C. with capacitance values up to 700 picofarads, and which were encapsulated in a cylindrical insulating casing 14 having a maximum outer diameter of 0.200 inch and a length of 0.350 inch maximum. Capacitors of this size may be readily placed on tape on 0.2 inch centers for pre-insertion sequencing in automatic insertion equipment. The mica capacitors thus produced can be inserted on 0.5 inch hole separations commonly used in automatic insertion equipment which are also employed to insert small electrical components such as resistors and diodes.

Thus, in accordance with the described embodiment of the present invention, a capacitor is provided having a generally uniform casing or wall thickness about the rectangular shaped capacitor section assembly 12, and which has a greater picofarad rating to case size diameter ratio than heretofore available in the prior art.

It will be understood to those skilled in the art that changes and modifications may be made in the illustrated and described embodiment of the present invention without departing from the invention in its broader aspects.

I claim:

1. A capacitor comprising, in combination, a capacitor section including at least two spaced electrodes having dielectric means interposed therebetween, a pair of end clips securing said spaced electrodes and dielectric means along opposite edge portions in superimposed relation, said end clips each having generally parallel leg portions formed to engage opposite marginal edge surfaces of the capacitor section, the portion of each of said end clips intermediate said parallel leg portions being spaced from the corresponding end surface of the capacitor section, one of said end clips being conductively connected to one of said spaced electrodes and insulated from the other of said electrodes, the other of said end clips being conductively connected to the other of said spaced electrodes and insulated from the said one of said spaced electrodes, a conductor lead wire secured centrally to each of said end clips, said lead wires being longitudinally aligned and having their axes coincident with the longitudinal axis of said superimposed electrodes and dielectric means, and an insulating casing encapsulating said capacitor section and said end clips with said lead wires extending axially outwardly from the ends of said casing.

2. A capacitor as defined in claim 1 in which said dielectric means interposed between said spaced electrode comprises a mica sheet having conductive electrodes surfaces for contact with the adjacent ones of the spaced electrodes, and wherein said electrodes comprise conducting foil electrodes disposed in conducting contact with the adjacent ones of said conductive electrode surfaces and with selected ones of said end clips.

3. A capacitor as defined in claim 1 wherein said spaced electrodes and dielectric means comprise alternate layers of dielectric and electrodes disposed in superimposed relation, alternate ones of said electrodes being connected to one of said end clips, and the remaining ones of said electrodes being connected to the other of said end clips.

4. A capacitor as defined in claim 1 wherein said end clips are made from a material having approximately 60 – 70 percent copper and approximately 40 – 30 percent zinc with no more than 2 percent impurities.

5. A mica capacitor as defined in claim 4 wherein said lead wires are made from electrically conductive wire having a protective plating in the order of 0.0003 inch thickness.

6. A method of making a capacitor comprising the steps of positioning at least one sheet of dielectric material having electrode coatings on opposite surfaces in superimposed relation between spaced sheets of insulating material to define a capacitor section, securing said superimposed sheets of dielectric and insulation material in laminated relation by end clips having parallel leg portions formed to engage opposite lateral edge surface portions of said sheets, said end clips each having a portion intermediate the parallel leg portions thereof spaced from the corresponding end of the capacitor section, thereafter attaching a lead wire centrally to each of said end clips such that the axes of the lead wires are longitudinally aligned and coincide with the longitudinal axis of said capacitor section, and encasing said capacitor section and end clips within a cylindrical casing such that the lead wires extend axially outwardly of said cylindrical casing.

7. The method of claim 6 wherein said end clips are made from a material having approximately 60 – 70 percent copper and approximately 40 – 30 percent zinc with no more than 2 percent impurities.

8. The method of claim 7 wherein said lead wires are made from electrically conductive wire having a protective plating, and wherein said step of attaching said lead wires to said end clips is performed by welding.

9. The method of making capacitors which comprises the steps of: assembling at least one pair of planar electrode sheets with a dielectric sheet therebetween in superimposed relation between planar sheets of insulation material, said electrode, dielectric and insulation sheets having planar surface areas equal to the combined planar surface areas of a plurality of capacitor sections of predetermined finished size, securing said superimposed sheets in laminated relation by end clips which are formed to engage opposite marginal edge portions of the assembled sheets, establishing electrical conductive contact between each of said end clips and selected ones of the electrode sheets, severing said laminated sheets into capacitor sections of predetermined finished size, thereafter attaching a lead wire centrally to each end clip of the severed capacitor sections such that the axes of the lead wires of each capacitor section are axially aligned with the longitudinal axis of the associated capacitor section, and encasing each of said capacitor sections and the associated end clips within a cylindrical casing such that the lead wires extend axially outwardly of said cylindrical casing.

* * * * *